United States Patent
Yang et al.

(10) Patent No.: US 10,063,804 B2
(45) Date of Patent: Aug. 28, 2018

(54) DISPLAY APPARATUS AND METHOD FOR CONTROLLING DISPLAY OF DISPLAY APPARATUS

(71) Applicant: SAMSUNG ELECTRONICS CO., LTD., Suwon-si (KR)

(72) Inventors: Geun-sam Yang, Suwon-si (KR); Seung-bok Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/261,292

(22) Filed: Sep. 9, 2016

(65) Prior Publication Data

US 2017/0078610 A1    Mar. 16, 2017

(30) Foreign Application Priority Data

Sep. 16, 2015    (KR) .................. 10-2015-0131170

(51) Int. Cl.
*H04N 5/44*    (2011.01)
*H04N 5/63*    (2006.01)
(Continued)

(52) U.S. Cl.
CPC .............. *H04N 5/63* (2013.01); *G06F 3/016* (2013.01); *H04N 5/4403* (2013.01);
(Continued)

(58) Field of Classification Search
CPC ...... H04N 5/63; H04N 5/4401; H04N 5/4403; H04N 5/50; H04N 7/025;
(Continued)

(56) References Cited

U.S. PATENT DOCUMENTS 8,605,634 B2    12/2013  Jeon et al.
9,197,313 B2 *  11/2015  Delpuch ............... H04L 69/08
(Continued)

FOREIGN PATENT DOCUMENTS

EP    1926310 A1    5/2008
JP    3113502 U     9/2005
(Continued)

OTHER PUBLICATIONS

International Search Report (PCT/ISA/210) dated Jan. 6, 2017 issued by the International Searching Authority in counterpart International Application No. PCT/KR2016/010380.
(Continued)

*Primary Examiner* — Michael Lee
(74) *Attorney, Agent, or Firm* — Sughrue Mion, PLLC

(57) ABSTRACT

A display apparatus and a method for controlling display of a display apparatus are provided. The display apparatus includes a display; a communicator configured to receive control information from a remote control device; and a controller configured to control the display and the communicator. In a standby mode in which the display is powered off, the controller may control to change a state of the display apparatus from the standby mode into a pre-power on mode in response to first control information received from the remote control device, and the controller may control the display to display content in a normal mode which is changed from the pre-power on mode in response to second control information received from the remote control device.

13 Claims, 11 Drawing Sheets

(51) Int. Cl.
*G06F 3/01* (2006.01)
*H04W 4/80* (2018.01)
*H04N 21/422* (2011.01)
*H04N 21/443* (2011.01)

(52) U.S. Cl.
CPC ... *H04N 21/42204* (2013.01); *H04N 21/4436* (2013.01); *H04W 4/80* (2018.02); *H04N 2005/443* (2013.01); *H04N 2005/4426* (2013.01); *Y02D 70/00* (2018.01); *Y02D 70/142* (2018.01); *Y02D 70/144* (2018.01); *Y02D 70/166* (2018.01); *Y02D 70/168* (2018.01)

(58) Field of Classification Search
CPC .... H04N 2005/4426; H04N 2005/443; H04W 4/008; G06F 3/16
USPC ......................................................... 348/734
See application file for complete search history.

(56) References Cited

U.S. PATENT DOCUMENTS

| | | | |
|---|---|---|---|
| 2006/0236143 | A1 | 10/2006 | Kidoguchi |
| 2009/0045970 | A1 | 2/2009 | Miyabayashi et al. |
| 2012/0092563 | A1* | 4/2012 | Kwon ................ H04N 21/4122 348/734 |
| 2013/0054954 | A1 | 2/2013 | Lee |
| 2013/0065584 | A1 | 3/2013 | Lyon et al. |
| 2013/0242202 | A1* | 9/2013 | Shintani ............... H04N 21/426 348/730 |
| 2014/0071350 | A1* | 3/2014 | Shintani ............... H04N 21/426 348/730 |
| 2014/0357192 | A1 | 12/2014 | Azogui et al. |
| 2015/0012761 | A1 | 1/2015 | Li et al. |
| 2015/0099467 | A1 | 4/2015 | Kang |
| 2015/0109535 | A1* | 4/2015 | Huang ............... H04N 21/4432 348/730 |
| 2015/0296073 | A1* | 10/2015 | Lo .......................... G08C 17/02 455/41.2 |

FOREIGN PATENT DOCUMENTS

| | | |
|---|---|---|
| JP | 2013-207308 A | 10/2013 |
| KR | 10-2005-0115574 A | 12/2005 |
| KR | 10-2011-0030429 A | 3/2011 |
| KR | 10-1499617 B1 | 3/2015 |
| KR | 10-2015-0040128 A | 4/2015 |

OTHER PUBLICATIONS

Written Opinion (PCT/ISA/237) dated Jan. 6, 2017 issued by the International Searching Authority in counterpart International Application No. PCT/KR2016/010380.
Communication dated Mar. 26, 2018 by the European Patent Office in counterpart European Patent Application No. 16846897.3.
Communication dated Jun. 25, 2018 by the European Patent Office in counterpart European Patent Application No. 16846897.3.

* cited by examiner

DISPLAY APPARATUS AND METHOD FOR CONTROLLING DISPLAY OF DISPLAY APPARATUS

CROSS-REFERENCE TO RELATED APPLICATION

This application claims priority from Korean Patent Application No. 10-2015-0131170, filed on Sep. 16, 2015 in the Korean Intellectual Property Office, the disclosure of which is incorporated herein by reference in its entirety.

BACKGROUND

1. Field

Apparatuses and methods consistent with exemplary embodiments relate to a display apparatus and a method for controlling display of the display apparatus, and more particularly to, a display apparatus configured to use a remote controller and the method for controlling the display of the display apparatus.

2. Description of the Related Art

As an interface between the display apparatus and a user, a panel key (or function key) of a display apparatus or a remote controller is widely used. By the development of the technology, functions of the display apparatus have become complex and diverse (for example, executing various applications and games), and thus executing contents downloaded externally, such as a video or internet browsing, is available.

As a result of complicated and various functions of the display apparatus, a booting time of the display apparatus may increase. There is necessity to shorten a booting time of the display apparatus, separate from a high performance display apparatus.

SUMMARY

Exemplary embodiments address at least the above problems and/or disadvantages and other disadvantages not described above. Also, the exemplary embodiments are not required to overcome the disadvantages described above, and may not overcome any of the problems described above.

One or more exemplary embodiments provide a display apparatus which can control a screen of the display apparatus by using a communicator and a sensor of a remote control device which conforms to the Bluetooth low energy standard and a method for controlling the display of the display apparatus.

One or more exemplary embodiments provide a display apparatus which can control a screen of the display apparatus by using a communicator, a sensor, and a power button of a remote control device which conforms to the Bluetooth low energy standard and a method for controlling the display of the display apparatus.

One or more exemplary embodiments provide a display apparatus which can shorten a booting time of the display apparatus by using a communicator and a sensor of a remote control device which conforms to the Bluetooth low energy standard and a method for controlling the display of the display apparatus.

One or more exemplary embodiments provide a display apparatus which can shorten a booting time of the display apparatus by using a communicator, a sensor, and a power button of a remote control device which conforms to the Bluetooth low energy standard and a method for controlling the display of the display apparatus.

According to an aspect of an exemplary embodiment, there is provided a display apparatus including: a display, a communicator configured to receive control information from a remote control device, and a controller configured to control the display and the communicator. In a standby mode in which the display is powered off, the controller may control to change a state of the display apparatus from the standby mode into a pre-power on mode in response to first control information received from the remote control device, and the controller may control the display to display content in a normal mode which is changed from the pre-power on mode in response to second control information received from the remote control device.

The display apparatus may further include a power supply, and the controller may control the power supply to provide power to the display apparatus except for the display in the pre-power on mode.

The controller may control a near field communicator to receive the first control information.

The first control information may be received through an optical receiver.

The controller may control the communicator to receive an advertising packet conforming to the Bluetooth low energy standard comprising the first control information.

The controller may control the communicator to receive a packet comprising the second control information, and the packet may conform to the Bluetooth low energy standard.

The display apparatus may further include an audio outputter, and a power supply, wherein the controller may control the power supply to provide power to the display apparatus except for the audio outputter in the pre-power on mode.

The controller may control the power supply to continuously provide power to the communicator in the standby mode.

The controller may include a main processor and a sub processor, and the communicator is controlled by the sub processor in the standby mode.

The controller may control the display to display a preset screen on a portion of the display apparatus in the pre-power on mode.

When the second control information is not received for a predetermined time in the pre-power on mode, the controller may change the state of the display apparatus from the pre-power on mode to the standby mode.

According to an aspect of another exemplary embodiment, there is provided a method for controlling display of a display apparatus, the method including: receiving, in a standby mode in which the display of the display apparatus is powered off, first control information from a remote control device through a communicator, changing a state of the display apparatus from the standby mode into a pre-power on mode in response to receiving of the first control information, receiving, in the pre-power on mode, second control information from the remote control device, and changing the state of the display apparatus from the pre-power on mode into a normal mode and displaying content on the display in response to receiving of the second control information.

The first control information may be an advertising packet conforming to the Bluetooth low energy standard.

The second control information may be included in a payload of the advertising packet conforming to the Bluetooth low energy standard.

When the display apparatus is in the pre-power on mode, no power is supplied to the display of the display apparatus.

According to an aspect of another exemplary embodiment, there is provided a remote controller including: a sensor configured to detect a first user input, a power button configured to be selected to turn on a display apparatus, a communicator configured to communicate with the display apparatus, and a controller configured to control the sensor and the communicator. The controller may control the communicator to transmit first control information that corresponds to the detected first user input to the display apparatus in which a display is powered off, and control the communicator to transmit second control information that corresponds to a second user input of selecting of the power button to the display apparatus.

The first user input may include at least one from among a touch directed to the remote control device, a grip directed to the remote control device, a motion of the remote control device, and an acceleration change of the remote control device.

The controller may control the communicator to transmit an advertising packet comprising the first control information to the display apparatus, and the advertising packet conforms to the Bluetooth low energy standard.

The controller may control the communicator to transmit a packet comprising the second control information to the display apparatus, and the packet conforms to the Bluetooth low energy standard.

The controller may provide at least one of an auditory feedback and a tactile feedback in response to at least one of the transmission of the first control signal and the transmission of the second control signal.

According to another aspect of an exemplary embodiment, there is provided a display apparatus including: a display, a power supply, a communicator configured to receive control information from a remote control device, and a controller configured to control the display, the power supply, and the communicator. The controller may change a state of the display apparatus from a standby mode into a pre-power on mode in response to the received control information.

When the display apparatus operates in the standby mode, the controller may control the power supply not to provide power to the display apparatus except for the communicator, and when the display apparatus operates in the pre-power on mode, the controller may control the power supply to provide power to the display apparatus except for the display.

When the display apparatus operates in the pre-power on mode, the controller may control the power supply to provide power to a portion of the display such that a remaining portion of the display receives no power.

The controller may control the display to display a preset screen on the portion of the display of the display apparatus in the pre-power on mode.

The controller may include a main processor and a sub processor, and the communicator is controlled by the sub processor in the standby mode.

BRIEF DESCRIPTION OF THE DRAWINGS

The above and/or other aspects will be more apparent by describing in detail exemplary embodiments with reference to the accompanying drawings, in which.

DETAILED DESCRIPTION OF EXEMPLARY EMBODIMENTS

Figure 1:
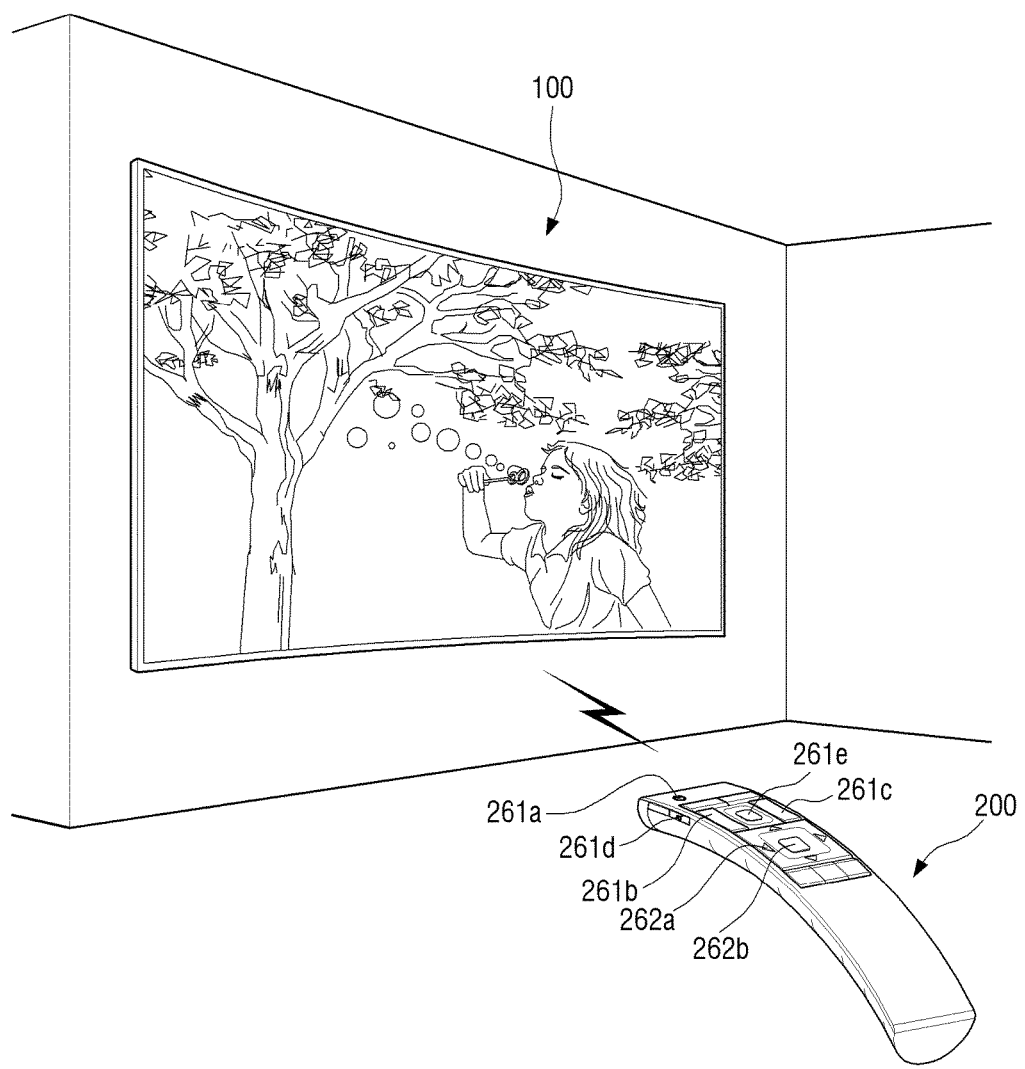
FIG. 1 is a diagram illustrating an operation between a display apparatus and a remote controller according to an exemplary embodiment.

Certain exemplary embodiments will now be described in greater detail with reference to the accompanying drawings.

In the following description, same drawing reference numerals are used for the same elements even in different drawings. The matters defined in the description, such as detailed construction and elements, are provided to assist in a comprehensive understanding of the exemplary embodiments. Accordingly, it is apparent that the exemplary embodiments can be carried out without those specifically defined matters. Also, well-known functions or constructions are not described in detail since they would obscure the inventive concept with unnecessary detail.

The terms "first," "second," and so on may be used in describing a variety of elements, but the elements are not limited by these terms. The terms are used solely for the purpose of distinguishing one element from another. For example, without departing from the scope of the present disclosure, a first element may be named as a second element, and similarly, the second element may be named as the first element. The term "and/or" may include any one of a combination of a plurality of associated items or any item of a plurality of associated items.

In the exemplary embodiments, a "selecting a button (or key)" of the remote controller 200 (FIG. 1) may refer to a pressing of a button (or a key) or a touching of a button (or a key). Further, "user input," for example, may refer to a selecting of a button (or a key) by a user, a user's voice, a presence of a user (e.g., a user becomes present within a camera-recognition range), and/or a user's motion.

In the exemplary embodiments, a "touching (including a touch gesture) at the remote controller 200" may be input by a user's body part or an input pen (e.g., a stylus (not illustrated)) manipulated by the user.

In the exemplary embodiments, a "screen of a display apparatus" may refer to a meaning to include a display of the display apparatus.

In the exemplary embodiments, a "screen off of a display apparatus" may refer to the same meaning as a power-off state of the display apparatus. In the screen off of the display apparatus, a plug of a power cable of the display apparatus is connected to a power outlet.

The terms and expressions used throughout the disclosure are to describe certain exemplary embodiments, and these are not intended to restrict and/or limit the present disclosure. A singular expression, unless otherwise stated, encompasses plural expression. It is also to be understood that the term such as "comprise," or "have" used herein are to designate the presence of characteristics, numbers, steps, operations, elements, components, or a combination thereof, but not to preclude possibility of presence or addition of one or more other characteristics, numbers, steps, operations, elements, components or a combination thereof.

The same reference numerals used in the drawings refer to the elements with the substantially same functions.

FIG. 1 is a diagram illustrating an operation between a remote controller and a display apparatus according to an exemplary embodiment.

Referring to FIG. 1, a display apparatus 100 and a remote controller (also referred to herein as a "remote control device") 200 are illustrated.

The remote controller 200 may control the display apparatus 100 by transmitting a control command through infrared communication or near field communication (e.g., Bluetooth).

A user may control (for example, by performing any one or more of power on/off, booting, channel changing, volume adjusting, or content reproducing operations) the display apparatus 100 by selecting a button (including a key) of the remote controller 200 or by using various interaction methods (for example, any one or more of touch pad, voice recognizing through a microphone, or motion recognizing through a sensor). Further, a user may control (for example, by performing any one or more of power on/off, booting, channel changing, volume adjusting, or content reproducing operations) the display apparatus 100 through a motion recognizing by using a camera 145 attached to the display apparatus.

A user may control a screen of the display apparatus 100 by performing a motion (such as, for example, a touching, gripping or moving) of the remote controller 200. For example, a user may control to operate a power on display apparatus 100 (for example, turn on a screen) by touching, gripping or moving the remote controller 200. Further, a user may control to operate a power on display apparatus 100 (for example, turn on a part of the screen) by using a motion of the remote controller 200.

In response to a motion of the remote controller 200, the display apparatus 100 may turn on a power supply to a screen. In response to a motion of the remote controller 200, the display apparatus 100 may turn on a power supply to a part of a screen. In response to a motion of the remote controller 200, power can be supplied to a part of a screen of the display apparatus 100.

Figure 2:
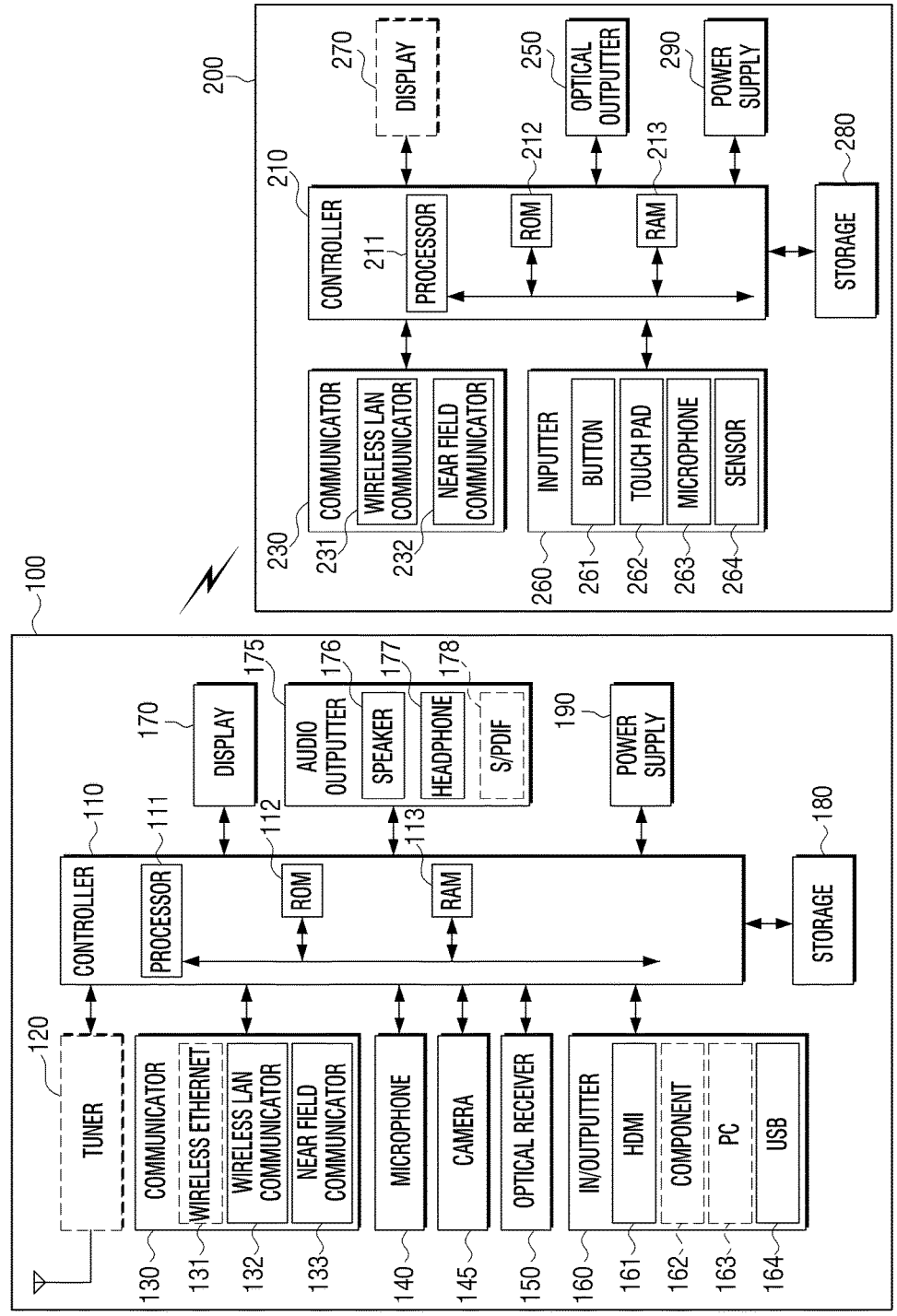
FIG. 2 is a block diagram illustrating a display apparatus and a remote controller according to an exemplary embodiment.

The display apparatus 100 may detect presence of a user by using a camera 145 (FIG. 2). For example, the camera 145 may detect the user in the display apparatus 100 of which the screen is turned off.

Referring to FIG. 1, the remote controller 200 may include a button 261 (or a key) corresponding to functions and/or operations of the display apparatus 100. The button 261 may include a physical button or a touch button. Further, the remote controller 200 may include a single function button (e.g., 261a, 261b, 261c, 261d, 261e, 262a, 262b) that corresponds to functions of the display apparatus 100 and/or a multi function button (not illustrated).

The "single function button" of the remote controller 200 may be used as a term indicating a button which corresponds to control of one function from among a plurality of functions performed in the display apparatus 100. More than a half of the buttons in the remote controller 200 may be a single function button.

The multi function button (e.g., a color button (not illustrated)) of the remote controller 200 may be used as a term indicating a button which corresponds to control of additional functions which are variably provided (or established) according to functions performed in the display apparatus 100. The multi function button may be expressed in different colors (e.g., a red button, a yellow button, a green button) from the other buttons. In this case, the multi function button may be named as a color button. An arrangement order of the multi function buttons (not illustrated) can be varied, and the number of the multi function buttons (not illustrated) may be added, changed, or deleted correspondingly to the functions of the display apparatus 100.

FIG. 2 is a block diagram illustrating a display apparatus and a remote controller according to an exemplary embodiment.

Referring to FIG. 2, the display apparatus 100 which receives control information from the remote controller 200 may be connected to an external electronic device (not illustrated) with or without a wire through a communicator 130 or an inputter/outputter 160. The external electronic device may include a mobile phone (not illustrated), a smart phone (not illustrated), a tablet PC (not illustrated), a PC (not illustrated), and a server (not illustrated).

The display apparatus 100 may include the display 170, and may further include a tuner 120, the communicator 130, the inputter/outputter 160. The display apparatus 100 may include the display 170, and may further include a combination of the tuner 120, the communicator 130, and the inputter/outputter 160. Further, the display apparatus 100 including the display 170 may be electrically connected to another device (not illustrated) including a tuner (e.g., a set-top box).

The display apparatus 100 may be implemented as any of an analog TV, digital TV, 3D-TV, smart TV, LED TV, OLED TV, plasma TV, monitor, a curved TV having a screen with a fixed curvature, a flexible TV having a screen with a fixed curvature, a bended TV having a screen with a fixed curvature, and/or a curvature modifiable TV in which the curvature of a current screen can be changed with a received user input. However, it is not limited thereto, which can be easily understood by those of ordinary skill in the art.

The display apparatus 100 may include a controller 110, the tuner 120, the communicator 130, the microphone 140, the camera 145, an optical receiver 150, the inputter/outputter 160, the display 170, an audio outputter 175, a storage 180, and a power supply 190. The display apparatus 100 may include a sensor (e.g., any of an illumination sensor, a temperature sensor, etc., not illustrated) to detect an internal state or an external state of the display apparatus 100.

The controller 110 may include a processor 111, a read-only memory (ROM) 112 (or non-volatile memory) storing a control program for controlling the display apparatus 100, and a random-access memory (RAM) 113 (or volatile memory) storing signals or data inputted from an outside of the display apparatus 100, or used as storing area corresponding to various operations performed in the display apparatus 100.

The controller 110 may perform functions to control overall operations of the display apparatus 100, to control signal flow among internal elements 120 to 190 of the display apparatus 100, and to process data. The controller 110 may control power which is provided to the internal elements 120 to 180 from the power supply 190.

The processor 111 may include a processor (such as, for example, a graphic processing unit (GPU), not illustrated) for graphic processing that corresponds to an image or a video. The processor 111 may be implemented as a system on chip (SoC) including a core (not illustrated) and a GPU.

Further, the processor 111 may be implemented as a SoC including at least one of the ROM 112 and the RAM 113. The processor 111 may include any of a single core, a dual core, a triple core, a quad core, and a multiple number of the above cores.

The processor 111 may include a plurality of processors. The plurality of processors may include a main processor (not illustrated) operating in a pre-power on mode which corresponds to one of the states of the display apparatus 100 and/or in a normal mode which displays broadcasting screen, and a sub processor (not illustrated) operating in a standby mode which corresponds to one of another states of the display apparatus 100 (e.g., the display apparatus is electrically turned off and the power plug is connected to the power outlet). The pre-power on mode may indicate a mode in which a preparation is made for the display apparatus 100 to be activated. In the pre-power on mode, the display apparatus 100 may be immediately activated, and perform the pre-work processes that can display various contents. The term such as pre-power on mode can be substituted with a different term.

The controller 110 including the main processor may operate in the pre-power on mode and/or the normal mode. Further, the controller 110 including the sub processor may operate in the standby mode.

A plurality of processors may further include a sensor processor (not illustrated) to control a sensor (not illustrated). The processor 111, ROM 112, and RAM 113 may be interconnected via an internal bus.

The controller 110 may control the display 170 and the communicator 130 which receives control information from the remote controller 200. The controller 110, in response to first control information received from the remote controller in the standby mode in which the display is turned off, may control to change a state of the display apparatus from the standby mode to the pre-power on mode, and in response to second control information received from the remote controller, may control to change a state of the display apparatus from the pre-power on mode to the normal mode in which a content is displayed on the display 170.

The display apparatus may further include the power supply 190, and the controller 110 may control the power supply 190 to provide power to all parts of the display apparatus except for the display 170 in the pre-power on mode.

The controller 110 may control to receive the first control information via the near field communicator which is one of the communicator 130.

The controller 110 may control to receive advertising packet conforming to the Bluetooth low energy standard including the first control information via the communicator 130, the advertising packet being a packet conforming to the Bluetooth low energy standard.

The controller 110 may control the communicator 130 to receive packet including the second control information, the packet being a packet conforming to the Bluetooth low energy standard.

The display apparatus may further include the audio outputter 175 and the power supply 190, and the controller 110 may control the power supply 190 to provide power to all parts of the display apparatus except for the audio outputter 175 in the pre-power on mode.

The controller 110 may control the power supply 190 to continuously provide power to the communicator 130 in the standby mode.

The controller 110 may include the main processor and the sub processor, and the communicator 130 may be controlled by the sub processor in the standby mode.

The controller 110 may control the display 170 to display a preset screen on a part of the display 170 in the pre-power on mode.

The controller 110 may control such that the pre-power on mode returns to the standby mode when the second control information is not received for a preset time in the pre-power on mode.

According to an exemplary embodiment, the controller of the display apparatus 100 may include the processor 111, ROM 112, and RAM 113 of the display apparatus 100. In addition, the controller of the display apparatus 100 may include the main processor (not illustrated), the sub processor (not illustrated), ROM 112 and RAM 113 of the display apparatus 100. Further, the controller of the display apparatus 100 may include the main processor (not illustrated), the sub processor (not illustrated), a sensor processor (not illustrated), ROM 112 and RAM 113 of the display apparatus 100.

The configurations and operations of the controller 110 may be variously implemented according to exemplary embodiments, which can be easily understood by those of ordinary skill in the art.

The tuner 120 may tune and select a frequency of a channel which is received by the display apparatus 100, through amplification, mixing and resonance of a broadcasting signal which is received via wire or wirelessly. The broadcasting signal may include video, audio, and additional data (e.g., EPG (electronic program guide)).

The tuner 120 may receive video, audio and/or data from a frequency bandwidth corresponding to a channel number inputted by a user (e.g., cable broadcasting channel 506).

The tuner 120 may receive a broadcasting signal from any of various sources, such as ground wave broadcasting, cable broadcasting, or satellite broadcasting. The tuner 120 may receive a broadcasting signal from various sources such as analog broadcasting or digital broadcasting. The tuner 120 may be implemented as all-in-one type with the display apparatus 100, or a separate device (e.g., a set-top box, not illustrated), or a tuner (not illustrated) connected to the inputter/outputter 160.

The communicator 130 may connect the display apparatus 100 with the remote controller 200 or an external electronic device (not illustrated). Further, the communicator 130 may receive the control information that corresponds to control of the display apparatus 100 transmitted from the remote controller 200 by control of the controller 110.

The communicator 130 may include one of a wireless Ethernet 131, a wireless local area network (LAN) communicator 132 and a near field communicator 133 in response to performances and structures of the display apparatus 100. Further, the communicator 130 may include a combination of the wireless Ethernet 131, the wireless LAN communicator 132, and the near field communicator 133. The near field communication may include Bluetooth, Bluetooth low energy (BLE), IrDA (infrared data association), UWB (ultra wideband), or NFC (near field communication).

The near field communicator 133, according to an exemplary embodiment, may receive the control information transmitted from the remote controller 200. The near field communicator 133 may receive the advertising packet conforming to the Bluetooth low energy (BLE) standard including the control information (e.g., first control information) transmitted from the remote controller 200. Herein, the advertising packet conforming to BLE standard is referred to as BLE advertising packet for convenience of explanation.

The near field communicator 133 may receive the control information (e.g., second control information) transmitted from the remote controller 200 as packet conforming to BLE standard. Herein, the packet conforming to BLE standard is referred to as BLE packet. The near field communicator 133 may receive the first and the second control information transmitted from the remote controller 200 as the other packets (e.g., BLE advertising packet and BLE packet).

The microphone 140 may receive the voices uttered by a user. The microphone 140 may convert received voices into electrical signals and output the electrical signals to the controller 110. The user's voices, for example, may include voice that corresponds to control of a menu or a function in the display apparatus 100. A recognizable range of the microphone 140 may vary in response to a volume of the user's voices and a surrounded environment (e.g., speaker sounds, surrounded noises).

The microphone 140 may be implemented as an all-in-one type that is integral with the display apparatus 100, or separated from the display apparatus 100. The separated microphone 140 may be electrically connected to the display apparatus 100 through the communicator 130 or the inputter/outputter 160.

The camera 145 may photograph a video (e.g., consecutive frames) within a camera recognizable range. The photographed video may be used in recognizing a user motion. The user motion may include a presence of the user (e.g., a user appears within a camera recognizable range), a part of the user's body such as face, facial expression, hand, fist, and finger or a motion of a part of the user's body. The recognizable range of the camera 145 may be 0.2 m~5 m from the camera 145 to a user.

The camera 145 may consist of a lens (not illustrated) and an image sensor (not illustrated). The camera 145 may support an optical zoom function and/or a digital zoom function by using a plurality of lenses and image processing.

The camera 145 may be positioned on any one of an upper end, a lower end, a left side and a right side of the display apparatus 100. Further, the camera 145 may be positioned on any one of an upper end center area, a lower end right side area, a lower end center area and a lower end left side area of the display apparatus 100.

The camera 145, according to an exemplary embodiment, may photograph a user (or a user motion) in the display apparatus 100 which is powered off (but, a power plug is connected to a power outlet) by providing the power of the power supply 190. Further, the camera 145 may photograph a user (or user motion) in the display apparatus 100 in which the screen of the display apparatus 100 is turned off (or standby mode, the power plug is connected to the power outlet) by providing the power of the power supply 190.

The camera 145 may convert the images photographed by control of the controller 110 into electrical signals, and output the electrical signals to the controller 110. The controller 110 may analyze the photographed images and recognize the user motion. The controller 110 may display a menu on the display apparatus 100 by using the motion recognizing results, or perform a control (e.g., channel adjusting or volume adjusting, etc.) that corresponds to the motion recognizing results.

When the camera 145 includes a plurality of cameras, a three dimensional still image or a three dimensional motion may be received by using a first camera (not illustrated) in a front surface of the display apparatus 100 and a second camera (not illustrated) which is adjacent (e.g., an interval between the first camera (not illustrated) and the second camera (not illustrated) is greater than 5 mm and less than 80 mm) to the first camera.

The camera 145 may be implemented as an all-in-one type that is integrated with the display apparatus 100 or separated from the display apparatus 100. The electronic device (not illustrated) including the separated camera (not illustrated) may be electrically connected to the display apparatus 100 through the communicator 130 or the inputter/outputter 160.

The optical receiver 150 may receive optical signals (which may include control information) outputted from the remote controller 200 through optical window (not illustrated).

The optical receiver 150 may receive an optical signal that corresponds to a user input (e.g., any of a touch, a push, a touch gesture, voice or motion) from the remote controller 200. The control information may be detected from the received optical signal. The received optical signal and/or the detected control information may be transmitted to the controller 110.

The inputter/outputter 160 may receive contents externally from the display apparatus 100 by control of the controller 110. The contents, for example, may include a video, an image, a text or a web document. Further, the contents may include a video that includes advertisement, an image that includes advertisement, or web documents that includes advertisement.

The inputter/outputter 160 may include one of an HDMI (High-definition multimedia interface port) input port 161 that corresponds to receipt of contents, a component input jack 162, a PC input port 163, and a USB input jack 164. The inputter/outputter 160 may include a combination of HDMI input port 162, the component input jack 162, PC input port 163, and USB input jack 164. The inputter/outputter 160 may be added, deleted and/or changed according to performance and structure of the display apparatus 100, which can be easily understood by those of ordinary skill in the art.

The display 170 may display video included in a broadcasting signal received through the tuner 120 by control of the controller 110. The display 170 may display contents (e.g., video) inputted through the communicator 130 or the inputter/outputter 160. The display 170 may output contents stored in the storage 180 by control of the controller 110. Further, the display 170 may display voice UI (user interface) to perform a voice recognizing task that corresponds to the voice recognizing or a motion UI to perform a motion recognizing task. For example, the voice UI may include a voice command guide, and the motion UI may include a motion command guide.

The screen of the display apparatus 100, according to an exemplary embodiment, may be used as a term that includes the display 170 of the display apparatus 100.

The display 170, according to an exemplary embodiment, may display visual feedback that corresponds to the first control signal (or second control signal) received from the remote controller 200 by control of the controller 110. The first control signal or the second control signal may indicate a signal transmitted to deliver the first control information or the second control information.

The display 170, according to another exemplary embodiment, may be separated from the display apparatus 100. The display 170 may be electrically connected to the display apparatus 100 through the inputter/outputter 160 of the display apparatus 100.

The audio outputter 175 may output audio included in the broadcasting signal received through the tuner 120 by control of the controller 110. The audio outputter 175 may output audio (e.g., voice corresponding to the sound) inputted through the communicator 130 or the inputter/outputter 160. Further, the audio outputter 175 may output an audio file stored in the storage 180 by control of the controller 110.

The audio outputter 175 may include any one of a speaker 176, a headphone output component 177 or S/PDIF output component 178. Further, the audio outputter 175 may include a combination of the speaker 176, the headphone output component 177, and S/PDIF output component 178.

The audio outputter 175, according to an exemplary embodiment, may output auditory feedback corresponding to the first control signal (or second control signal) received from the remote controller 200 by control of the controller 110 of the display apparatus 100.

The storage 180 may store various data, programs and/or applications to drive and control the display apparatus 100 by control of the controller 110. The storage 180 may store an input/output signal or the data that corresponds to the tuner 120, the communicator 130, the microphone 140, the camera 145, the optical receiver 150, the inputter/outputter 160, the display 170, the audio outputter 175 and the power supply 190.

The storage 180 may store any one or more of a control program to control the display apparatus 100 and the controller 110, an application provided initially from a manufacturer or downloaded externally, a GUI (graphical user interface) related to an application, an object to provide GUI (e.g., image, text, icon, button, etc.), user information, document, database, and/or relevant data.

The storage 180 may include any one or more of a broadcasting receipt module, a channel control module, a volume control module, a communication control module, a voice recognition module, a motion recognition module, an optical receipt module, a display control module, an audio control module, an external inputting control module, a power control module, a voice database, and/or a motion database, which are not illustrated. Modules of storage unit and database which are not illustrated may be implemented as software format which is configured to perform any one or more of a control function of the broadcasting receiving, a channel control function, a volume control function, a communication control function, a voice recognition function, a motion recognition function, an optical receiving control function, a display control function, an audio control function, an external inputting control function, and/or a power control function. The controller 110 may perform the functions of the display apparatus 100 by using the software stored in the storage 180.

The storage 180 may store display apparatus information and/or remote controller information.

The storage 180 may store the first control information received from the remote controller 200.

The storage 180 may store the second control information received from the remote controller 200.

The storage 180 may store the video, the image, and/or the text corresponding to the visual feedback.

The storage 180 may store the sound corresponding to the auditory feedback.

The storage 180 may store a feedback providing time (e.g., 300 ms) of the feedback provided to a user.

The storage, according to an exemplary embodiment, may be used as a term including any of the storage 180, ROM 112 of the controller 110, RAM 113 of the controller 110, the storage (not illustrated) implemented as SoC (not illustrated), a memory card (e.g., micro SD card, USB memory, not illustrated) attached to the display apparatus 100, and/or an external storage (e.g., USB memory, not illustrated) that can be connected to USB port 164 of the inputter/outputter 160. Further, the storage may include any of a non-volatile memory, a volatile memory, a hard disk drive (HDD), and/or a solid state drive (SSD).

The power supply 190 may provide power inputted from an external power source to the internal elements 110 to 190 of the display apparatus 100 by control of the controller 110. The power supply 190 may provide power inputted from one or more batteries (not illustrated) positioned within the display apparatus 100 to the internal elements 110 to 190 by control of the controller 110.

The power supply 190 may include the first power supply (not illustrated) to provide power to the communicator 130 of the display apparatus 100 which is powered off (or only the screen of the display apparatus 100 is turned off, while the power plug is connected to the power outlet). The power supply 190 may include the first power supply (not illustrated) to provide power to the near field communicator 133 of the display apparatus 100 in which the power is off (but, the power plug is connected to the power outlet) and the sub processor (not illustrated) to control the near field communicator 133. Further, the power supply 190 may include the first power supply (not illustrated) to provide power to the camera 145 of the display apparatus 100 which is powered off (but, the power plug is connected to the power outlet) and the sensor processor (not illustrated) to control the camera 145.

The power supply 190 may include a battery (not illustrated) to provide power to the near field communicator 133 of the display apparatus 100 which is powered off (but, the power plug is connected to the power outlet).

Among the elements (e.g., 110 to 190) illustrated in the display apparatus 100 of FIGS. 1 and 2, at least one element may be added, changed or deleted (e.g., at least one of the boxes illustrated in dotted lines) in response to performance and/or type of the display apparatus 100. Further, positions of the elements (e.g., 110 to 190) may be changed in response to the performance or structure of the display apparatus 100, which can be easily understood by those of ordinary skill in the art.

Hereinafter, an exemplary embodiment of controlling the screen of the display apparatus will be explained in greater detail.

Referring to FIG. 2, the remote controller 200 which remotely controls the display apparatus 100 may include a controller 210, a communicator 230, an inputter 260, an optical outputter 250, a display 270, a storage 280, and a power supply 290. The remote controller 200 may include one of the communicator 230 and the optical outputter 250, or may include all of the communicator 230 and the optical outputter 250.

The remote controller 200 may be used as a term indicating a device that can control the display apparatus 100. Further, the remote controller 200 may include a device in which an application (not illustrated) for controlling the display apparatus 100 can be installed (or downloaded externally).

The electronic device that can install an application (not illustrated) for controlling the display apparatus 100 may include the display (e.g., touch screen or display panel excluding a touch panel). The electronic device including the display may include any of a cell phone (not illustrated), a smart phone (not illustrated), a tablet PC (not illustrated), a note PC (not illustrated), another display apparatus (not illustrated), and/or a home electronic device (e.g., refrigerator, washing machine or cleaning machine). A user may control the display apparatus 100 by using a function button (e.g., a channel button, not illustrated) on GUI (not illustrated) provided from the implementing application.

The controller 210 may include a processor 211, ROM 212 (or non-volatile memory) storing a control program to control the remote controller 200, and RAM 213 (or volatile memory) storing a signal or a data inputted externally from the remote controller 200 and used as storing area for various jobs performed in the remote controller 200.

The controller 210 may control overall operations of the remote controller 200 and signal flow among internal elements 220 to 290 of the remote controller 200, and perform a function to process data. The controller 210 may control a power supply to internal elements 220 to 290 by using the power supply 290.

The controller 210 may control a sensor detecting a first user input, a power button to turn on the display apparatus, and the communicator, control to transmit the first control information corresponding to the detected first user input through the communicator to the display apparatus in which the display is turned off, and control to transmit the second control information corresponding to the second user input of the selecting of the power button through the communicator to the display apparatus.

The controller 210 may control to transmit the advertising packet including the first control information through the communicator to the display apparatus, and the advertising packet may be packet conforming to BLE standard.

The controller 210 may control to transmit the packet including the second control information through the communicator to the display apparatus, and the packet may be packet conforming to BLE standard.

The controller 210 may provide one of auditory feedback and tactile feedback in response to one of the transmission of the first control signal and the second control signal.

According to an exemplary embodiment, the controller 210 of the remote controller 200 may include the processor 211, ROM 212, and RAM 213 of the remote controller 200.

The communicator 230 may be wirelessly connected to the display apparatus 100 by control of the controller 210. The communicator 230 may transmit the control information (e.g., control information corresponding to power on, or control information corresponding to a motion of the remote controller) which corresponds to a user input (e.g., a touch, a push, a touch gesture, a voice or a motion) to the display apparatus 100 by control of the controller 210. The communicator 230 may include at least one of the wireless LAN communicator 231 and the near field communicator 232 (e.g., one of the wireless LAN communicator 231 and the near field communicator 232, or both of the wireless LAN communicator 231 and the near field communicator 232).

The wireless LAN communicator 231 may be wirelessly connected to AP (access point) by control of the controller 210 at a place in which AP is installed. The wireless LAN communicator 231, for example, may include wireless fidelity (Wi-Fi). The wireless LAN communicator 231 may support wireless LAN standard (IEEE802.11x) of IEEE (Institute of Electrical and Electronics Engineers).

The near field communicator 232 may be wirelessly connected via the near field communication between the remote controller 200 and the display apparatus 100 without AP by control of the controller 210. The near field communication, for example, may include any of Bluetooth, Bluetooth low energy, infrared data association (IrDA), UWB (ultra wideband), or NFC (near field communication).

The near field communicator 232 may transmit the control information (e.g., first control information) to the display apparatus 100 as BLE advertising packet. Further, the near field communicator 232 may transmit the control information (e.g., second control information) to the display apparatus 100 as BLE packet.

The near field communicator 232 may transmit the first control information and the second control information to the display apparatus 100 as different packets with each other (e.g., BLE advertising packet and BLE packet).

The optical outputter 250 may output an optical signal (e.g., including the control information) corresponding to a user input (e.g., a touch, a push, a touch gesture, a voice or a motion) by control of the controller 210. The outputted optical signal may be received by the optical receiver 150 of the display apparatus 100. A remote controller code format used in the remote controller 200 may use one of a manufacturer-exclusive remote controller code format and a common remote controller code format. The remote controller code format may include leader code and data word. The outputted optical signal may be modulated with a carrier wave, and outputted. The control information may be stored in the storage 280 or generated by the controller 210. The remote controller 200 may include IR-LED (infrared-laser emitting diode).

The remote controller 200 may include one or both of the communicator 230 and the optical outputter 250 that can transmit the control information to the display apparatus 100.

The controller 210 may output the control information corresponding to a user input through one of the communicator 230 and the optical outputter 250 to the display apparatus 100. Further, the controller 210 may output the control information corresponding to the motion of the remote controller 200 through one of the communicator 230 and the optical outputter 250 to the display apparatus 100.

The controller 210 may transmit the control information corresponding to a user input and/or the control information corresponding to the motion of the remote controller 200 through one of the communicator 230 and the optical outputter 250 to the display apparatus 100 based on a priority.

The inputter 260 may include a button 261 and/or a touch pad 262 configured to receive a user input (e.g., a touch or a push) for control of the display apparatus 100. The inputter 260 may include a microphone 263 which receives uttered user voice which is one of a user input, a sensor 264 for detecting the motion of the remote controller 200, and/or a vibration motor (not illustrated) providing tactile feedback.

The inputter 260 may output an electrical signal (e.g., an analog signal or a digital signal) corresponding to the received user input (e.g., a touch, a push, a touch gesture, a voice or a motion) to the controller 210.

The button 261 may include buttons 261a, 261b, 261c, 261d, 261e of FIG. 1. The touch pad 262 may receive a touch or a touch gesture of a user.

Referring also to FIG. 1, the touch pad 262 may be implemented as a directional button 262a and an enter button 262b. Further, the touch pad 262 may be positioned on a front surface of the remote controller 200 in which the buttons 261a to 261e are not positioned.

The microphone 263 may receive the uttered user voice. The microphone 263 may convert the received voice into an electrical signal, and output the converted electrical signal to the controller 210.

The sensor 264 may detect an internal state and/or external state of the remote controller 200. For example, the sensor 264 may include a motion sensor (not illustrated) to detect the motion of the remote controller 200, a gyro sensor (not illustrated) to detect a direction by using the rotation inertia of the remote controller 200, an acceleration sensor (not illustrated) to detect a speed and/or a rate of acceleration of three axes (e.g., X-axis, Y-axis, and Z-axis) applied to the remote controller 200, or a gravity sensor (not illustrated) to detect a direction of the gravity. The sensor 264 may respectively measure movement acceleration or gravity acceleration of the remote controller 200.

The sensor 264 may include a force sensor (not illustrated) to detect a user touch or a user grip on the surface of the remote controller 200, or a pressure sensor (not illustrated). Further, the sensor 264 may include a grip sensor (not illustrated) to detect a user grip of the remote controller 200.

The sensor 264, according to an exemplary embodiment, may detect a motion (or an acceleration) of the remote controller 200 caused by a first user input. Further, the sensor 264 may detect a touch or a grip of the remote controller 200 caused by a first user input. The controller 210 may generate a control signal corresponding to the motion of the remote controller 200, and transmit through the communicator 230 to the display apparatus 100. Further, the controller 210 may generate a control signal corresponding to a user touch or a user grip, and transmit through the communicator 230 to the display apparatus 100.

A vibration motor (not illustrated) may convert an electrical signal into a mechanical vibration by control of the controller 210. For example, the vibration motor (not illustrated) may include any of a linear vibration motor, a bar type vibration motor, a coin type vibration motor, and/or a piezoelectric component vibration motor. One or more vibration motor (not illustrated) may be positioned within the remote controller 200. Further, the vibration motor (not illustrated) may cause the entire remote controller 200 to vibrate or cause a part of the remote controller 200 to vibrate.

The vibration motor (not illustrated), according to an exemplary embodiment, may output tactile feedback corresponding to a transmission of the control information according to control of the controller 210. The vibration motor (not illustrated) may provide various types of tactile feedback stored in the storage 280 (e.g., vibration intensity and vibration duration corresponding to various haptic patterns) based on the transmitted control information by control of the controller 210.

The display 270 may include a display of an LCD (liquid crystal display) method, an OLED (organic light emitting diodes) method, a PDP (plasma display panel) method, and/or a VFD (vacuum fluorescent display) method.

The display 270 may display a broadcasting channel number, a broadcasting channel name, and/or a state of the display apparatus (e.g., screen off, pre-power on mode, and/or normal mode), which are displayed on the display apparatus 100.

When the remote controller 200 and the display apparatus are connected by the near field communication, the display 270 may display a text that indicates "BT connected" or "NFC connected" by control of the controller 210.

When an optical signal is outputted from the remote controller 200 to the display apparatus 100, the display 270 may display, for example, texts, icons or symbols that correspond to "TV on" to indicate a turning on the display apparatus 100 by control of the controller 210, "TV off" to indicate a turning off the display apparatus 100, "Ch No." to indicate a selected channel number, and/or "Vol value" to indicate an adjusted volume.

The storage 280 may store various data, programs, and/or applications to drive and control the remote controller 200 by control of the controller 210. The storage 280 may store input or output signals and data that corresponds to driving of the communicator 230, the optical outputter 250, and the power supply 290.

The storage 280 may store the control information that corresponds to the received user input (e.g., a touch, a push, a touch gesture, a voice or a motion) and/or the control information that corresponds to the motion of the remote controller 200 by control of the controller 210.

The storage 280 may store remote controller information that corresponds to the remote controller 200. The remote controller information may include any of a model name, a device identification (ID), a remaining memory amount, object data existence, a Bluetooth version, and/or a Bluetooth profile.

The storage 280 may store the first control information that corresponds to a first user input transmitted to the display apparatus 100.

The storage 280 may store the second control information that corresponds to the selecting of the power button 261a (e.g., second user input) transmitted to the display apparatus 100.

The storage 280 may store one or two or more haptic patterns. The haptic patterns may be expressed as a wave form. The haptic patterns may indicate, for example, a vibration time (e.g., a unit is 50 ms) of the vibration motor (not illustrated) on a horizontal axis and a vibration intensity (e.g., a unit is 500 mV) of the vibration motor (not illustrated) on a vertical axis. The first haptic pattern may be a vibration which gradually increases from 0 V to 800 mV, gradually decreases to 100 mV, and increases again. Further, an acceleration section and a deceleration section may be symmetrical.

When a plurality of haptic patterns are stored in the storage 280, one pattern from among a plurality of haptic patterns may be stored as a favorite haptic pattern. When the favorite haptic pattern is set, the controller 210 may provide the favorite haptic pattern as tactile feedback through the vibration motor (not illustrated) with priority.

The haptic pattern may be added, changed or deleted in response to performance and structure of the remote controller 200, which can be easily understood by those of ordinary skill in the art.

The power supply 290 may provide power to the elements 210 to 290 of the remote controller 200 by control of the controller 210. The power supply 290 may provide power to the elements 210 to 290 from one or two or more batteries (not illustrated) positioned in the remote controller 200. The battery may be positioned on the internal region between the surface (e.g., surface in which the button 261 or the touch pad 262 are placed) of the remote controller 200 and a rear side (not illustrated).

Among the elements illustrated in the remote controller 200 of FIGS. 1 and 2, at least one element may be added or deleted (e.g., at least one of the boxes illustrated with dotted lines) in response to a performance of the remote controller 200. Further, positions of the elements may be changed in response to a performance or a structure of the remote controller 200, which can be easily understood by those of ordinary skill in the art.

Figure 3:
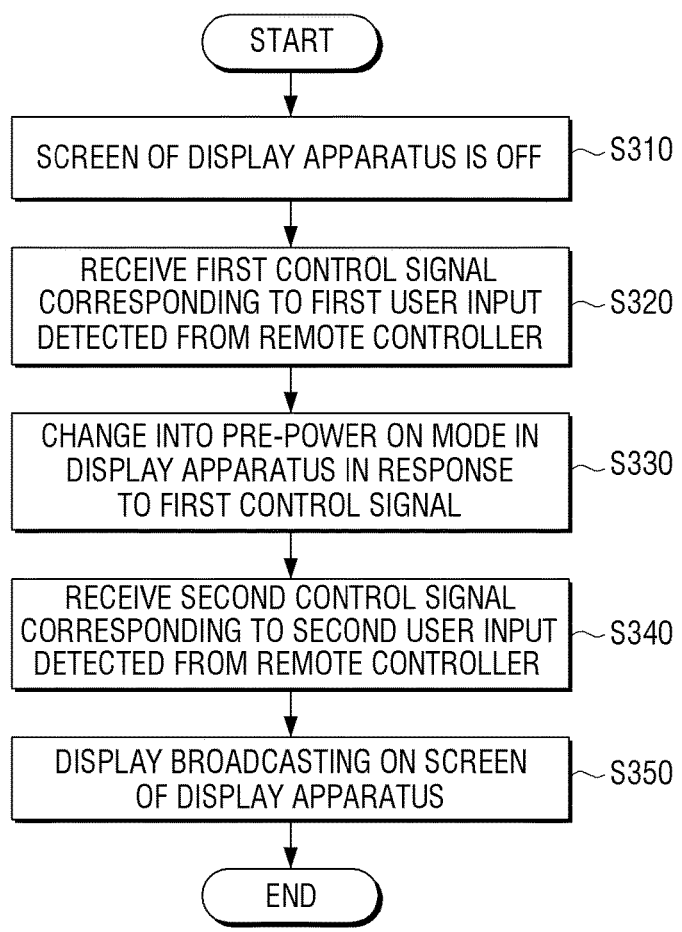
FIG. 3 is a flowchart illustrating a method for controlling display of a display apparatus according to an exemplary embodiment.

FIG. 3 is a flowchart illustrating a method for controlling the display of the display apparatus according to an exemplary embodiment.

Figure 4:
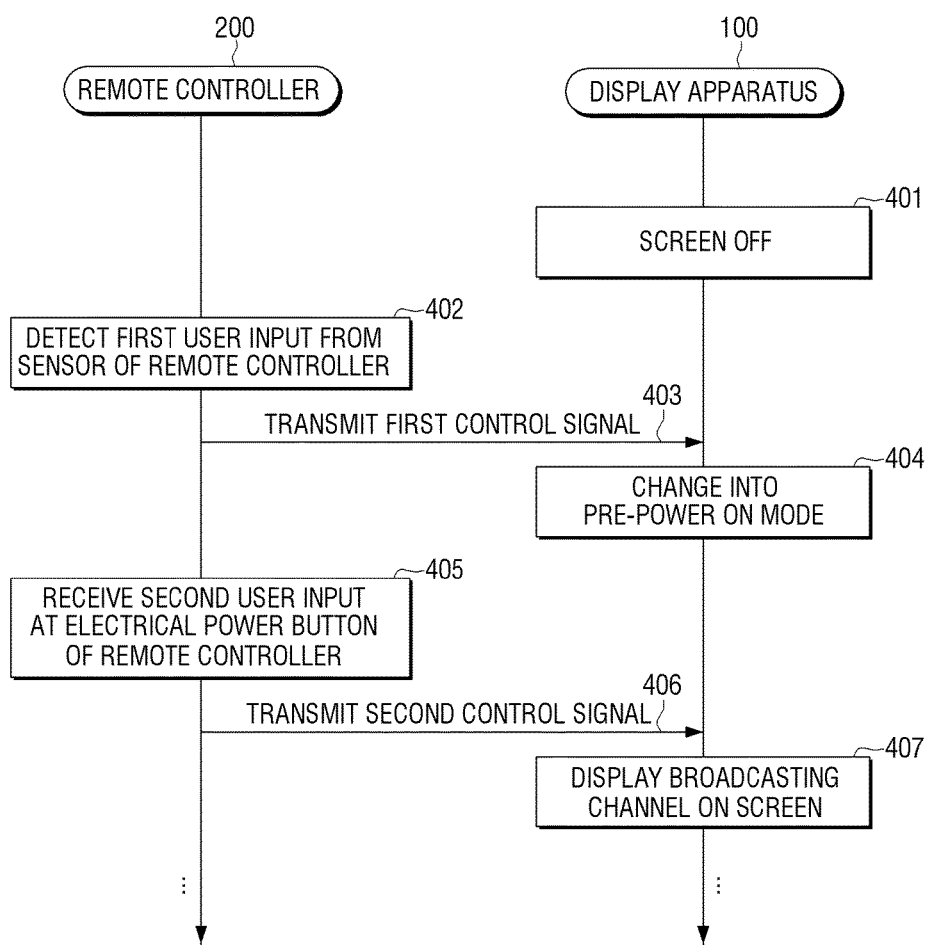
FIG. 4 is a sequence diagram illustrating a method for controlling display of a display apparatus according to an exemplary embodiment.

FIG. 4 is a sequence diagram illustrating the method for controlling the display of the display apparatus according to an exemplary embodiment.

FIGS. 5A to 5E are diagrams illustrating examples regarding the method for controlling the display of the display apparatus according to an exemplary embodiment.

At operation S310 of FIG. 3, the screen of the display apparatus may be turned off.

Figure 5A:
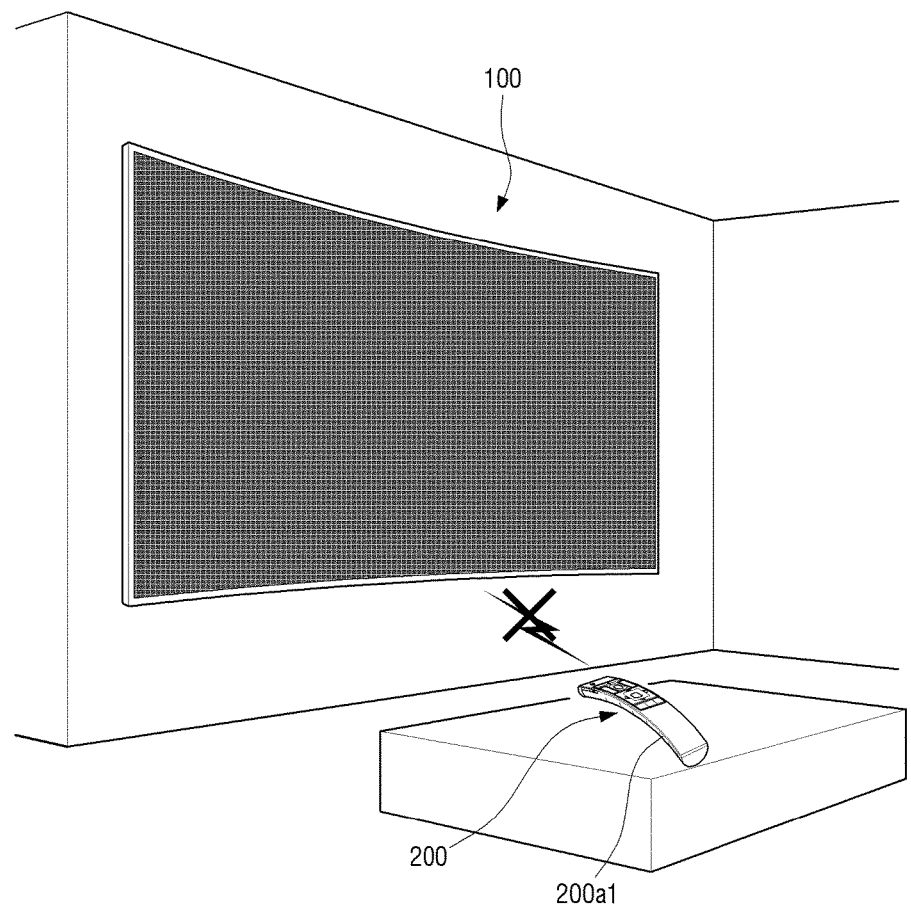
FIGS. 5A and 5E are diagrams illustrating examples regarding a method for controlling display of a display apparatus according to an exemplary embodiment.

Referring to FIGS. 4 and 5A, the screen of the display apparatus may be turned off (operation S401).

The screen of the display apparatus 100 may be turned off by a user. The screen of the display apparatus 100 may be turned off by selecting the power button 261a in the remote controller 200. Further, the screen of the display apparatus 100 may be turned off by a panel key (not illustrated) of the display apparatus 100. The panel key (not illustrated) may be positioned on the front surface, the side surface, or the back surface (e.g., surface of the bottom chassis) of the display apparatus 100. The panel key (not illustrated) may be a physical key or a touch key.

When the screen of the display apparatus 100 is turned off (or when the display apparatus 100 is powered off), the display apparatus 100 may be connected to the external power outlet through the cable of the power cable.

When the screen of the display apparatus 100 is turned off (or when the display apparatus 100 is powered off), power may be provided to the sub processor (not illustrated). When the screen of the display apparatus 100 is turned off, power may be continuously provided to the communicator 130. Further, when the screen of the display apparatus 100 is turned off, the controller 110 (or sub processor (not illustrated)) may control such that power is continuously provided to the near field communicator 133.

When the screen of the display apparatus 100 is turned off, the first power supply (not illustrated) may continuously provide power to the near field communicator 133 of the display apparatus 100 in which the screen is turned off by control of the controller 110 (or sub processor (not illustrated)). When the screen of the display apparatus 100 is turned off, the near field communicator 133 in which the power is provided may be an activated state.

Referring to FIG. 5A, the remote controller 200 that can control the display apparatus 100 in which the screen is turned off may be positioned on the adjacent area (e.g., an area in which the near field communication is available) of the display apparatus 100. The motion of the remote controller 200 with a user may not be detected. The controller 210 of the remote controller 200 may control the near field communicator 133 to transmit BLE advertising packet including the first control information corresponding to the first user input.

When the screen of the display apparatus 100 is turned off (or when the display apparatus 100 is powered off), the controller 110 of the display apparatus 100 may control the near field communicator 133 to scan BLE advertising packet transmitted externally.

At operation S320 of FIG. 3, the first control signal corresponding to the first user input detected in the remote controller may be received.

Figure 5B:
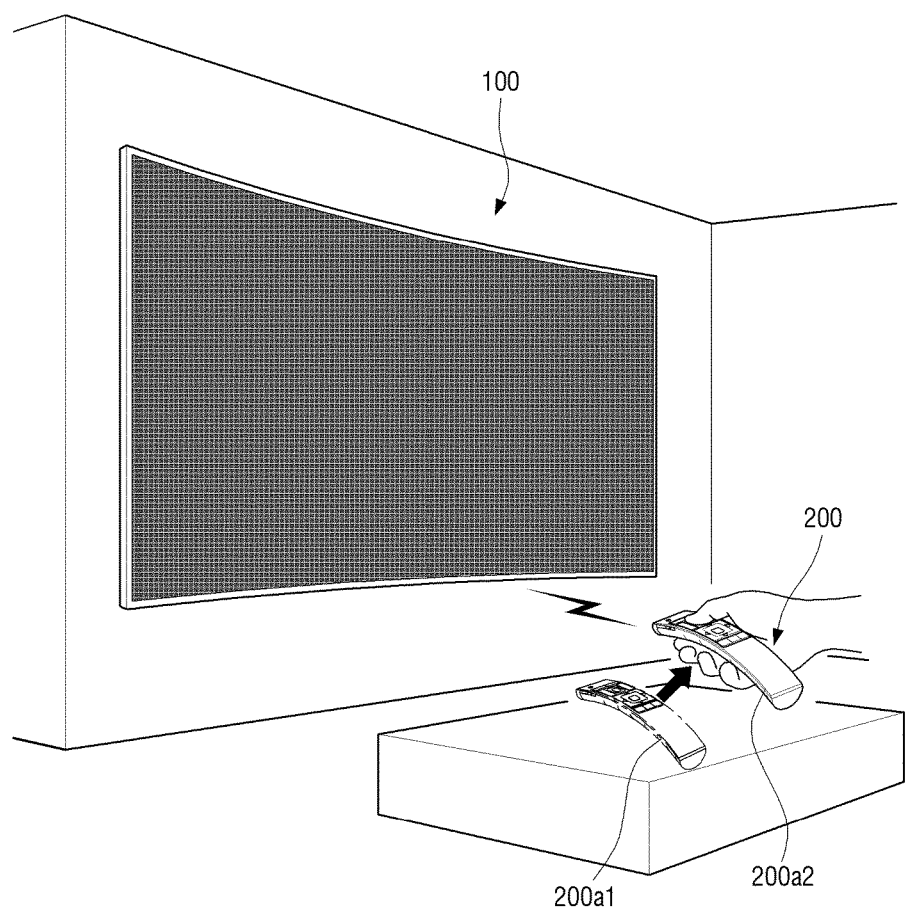

Referring to FIGS. 4 and 5B, the sensor 264 of the remote controller 200 may detect the motion of the remote controller (operation S402).

Referring to FIG. 5B, a user may touch the remote controller 200 positioned on the adjacent area (e.g., first position 200a1) of the display apparatus 100. The user may grip the remote controller 200 positioned on the adjacent area (e.g., first position 200a1) of the display apparatus 100, and move the remote controller 200 positioned on the adjacent area (e.g., first position 200a1) of the display apparatus 100.

The remote controller 200 may detect a first user input (e.g., a touch, a grip or a move) through the sensor 264. For example, when a first user input is a touch directed to the remote controller 200, the controller 210 may detect a user touch through the force sensor (or a pressure sensor, not illustrated) or the touch sensor which is one of the sensor 264.

The sensor which detects a user touch may be positioned on the front surface, the side surface, or the back surface of the remote controller 200. Further, when the display 270 of the remote controller 200 is a touch screen, the controller 210 may detect a user touch through the touch screen.

When a first user input is a grip, the controller 210 may detect a user grip through the force sensor (or pressure sensor) which is one of the sensor 264. The force sensor (or pressure sensor) which detects a user grip may be positioned on the front surface, the side surface, or the back surface of the remote controller 200.

The remote controller 200 may be moved by a user grip. For example, a user may tilt or rotate the remote controller 200 by gripping. Further, a user may move the gripping remote controller 200 from the first position 200a1 to a second position 200a2.

The controller 210 of the remote controller 200 may detect the motion of the remote controller 200 (e.g., a rotate, a tilt or a move). The motion of the remote controller 200 may be detected by the sensor 264. For example, the motion of the remote controller 200 may be detected by the motion sensor, the acceleration sensor, the geomagnetic sensor, or the gyro sensor.

The motion of the remote controller 200 may be periodically detected by the sensor 264 (e.g., the sensor resolution or detecting time interval of the established sensor).

The sensor 264 may output an analog signal corresponding to a first user input to the controller 210. Further, the analog signal outputted from the sensor 264 may be changed into a digital signal by a converter (not illustrated) and outputted the digital signal to the controller 210.

The controller 210 of the remote controller 200 may analyze an electrical signal received from the sensor 264 (e.g., an analog signal or a digital signal), and determine a touch and/or a grip of the remote controller 200. Further, the controller 210 of the remote controller 200 may analyze the signal received from the sensor 264 (e.g., an analog signal or a digital signal) and determine the motion of the remote controller 200 (e.g., a moving distance, a moving velocity or an acceleration change).

The storage 280 may store the analog signal and/or the digital signal received from the sensor 264 by control of the controller 210. Hereinafter, the stored analog signal or digital signal is referred to as remote controller detecting information. The stored remote controller detecting information may include a remote controller detecting information ID for the record management, a sensor ID, a detected acceleration value (e.g., two axes or three axes) of the remote controller 200, a moving detecting time of the remote controller 200, a moving distance of the remote controller 200, a touch detecting time of the remote controller 200, or a grip detecting time of the remote controller 200.

The remote controller detecting information may be periodically stored starting from the first position 200a1 of the remote controller 200 and arriving at the second position 200a2. The remote controller detecting information may be a class of the remote controller detecting information stored correspondingly to the sensor resolution and/or the detecting time interval of the sensor.

The controller 210 of the remote controller 200 may generate the first control information which is transmitted to the display apparatus 100 by using the remote controller detecting information. The controller 210 may generate the first control information by using the remote controller detecting information which is periodically stored. The controller 210 may generate the first control information from the first position 200a1 of the remote controller 200 to the second position 200a2 of the remote controller 200. Further, the controller 210 may load the first control information stored in the storage 280 or select the first control information among a plurality of control information in response to detecting of a first user input. The first control information may be control information corresponding to a modification of state from the standby mode (the screen is off) to the pre-power on mode of the display apparatus 100. The pre-power on mode may be explained in greater detail below.

Figure 6:
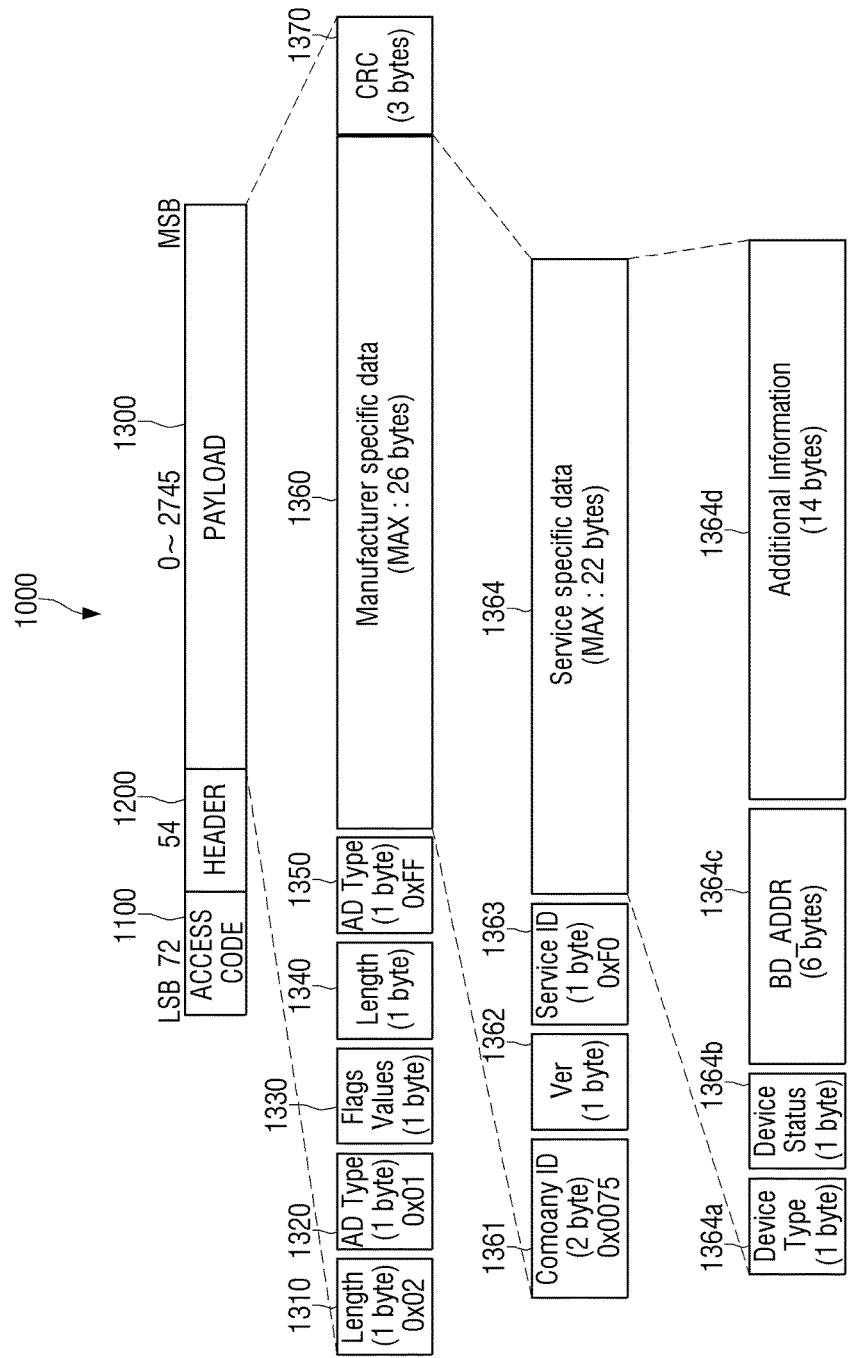
FIG. 6 is a diagram illustrating Bluetooth packet format according to an exemplary embodiment.

FIG. 6 is a diagram illustrating a Bluetooth packet format according to an exemplary embodiment.

Referring to FIGS. 4 and 5B, the controller 210 may transmit the first control information to the display apparatus 100 (operation S403).

The controller 210 may transmit the first control information to the display apparatus 100 through the communicator 230. The controller 210 may transmit the first control information as BLE advertising packet through the near field communicator 232 to the display apparatus 100.

When the first control information is transmitted through the near field communication (e.g., a Bluetooth low energy), the controller 210 of the remote controller 200 may transmit the first control information in Bluetooth packet 1000 of FIG. 6 to the display apparatus 100.

Bluetooth packet 1000 may include an access code 1100 (72 bit) for determining the effectiveness of the packet, a header 1200 (54 bit), and a payload 1300 (0-2,745 bit). The header 1200 may include MAC (media access control) address and packet type. The payload 1300 may include data to be transmitted, and a size of the payload 1300 may be changed according to the type of the transmitted packet. The first control information transmitted to the display apparatus 100 may be included in the payload 1300 of the packet.

The payload 1300 may include a payload length 1310, an advertising data type 1320, a flag value 1330, an advertising data length 1340, an advertising data type 1350, and manufacturer specific data 1360. A whole or a part of the first control information may be included in the manufacturer specific data 1360.

The manufacturer specific data 1360 may include a company ID 1361, a version 1362, a service ID 1363, and service specific data 1364. A whole or a part of the first control information may be included in the service specific data 1364.

The service specific data 1364 may include a device type 1364a, a device status 1364b, a Bluetooth device address 1364c, and additional information 1364d.

The controller 210 may periodically transmit the first control information through the near field communicator 232 to the display apparatus 100.

The communicator 130 of the display apparatus 100 may receive BLE advertising packet including the first control information from the remote controller 200 by control of the controller 110. The received first control information may be stored in the storage 180 by control of the controller 110.

At operation S330 of FIG. 3, the operational mode of the display apparatus may be changed into the pre-power on mode in response to the first control signal.

Figure 5C:
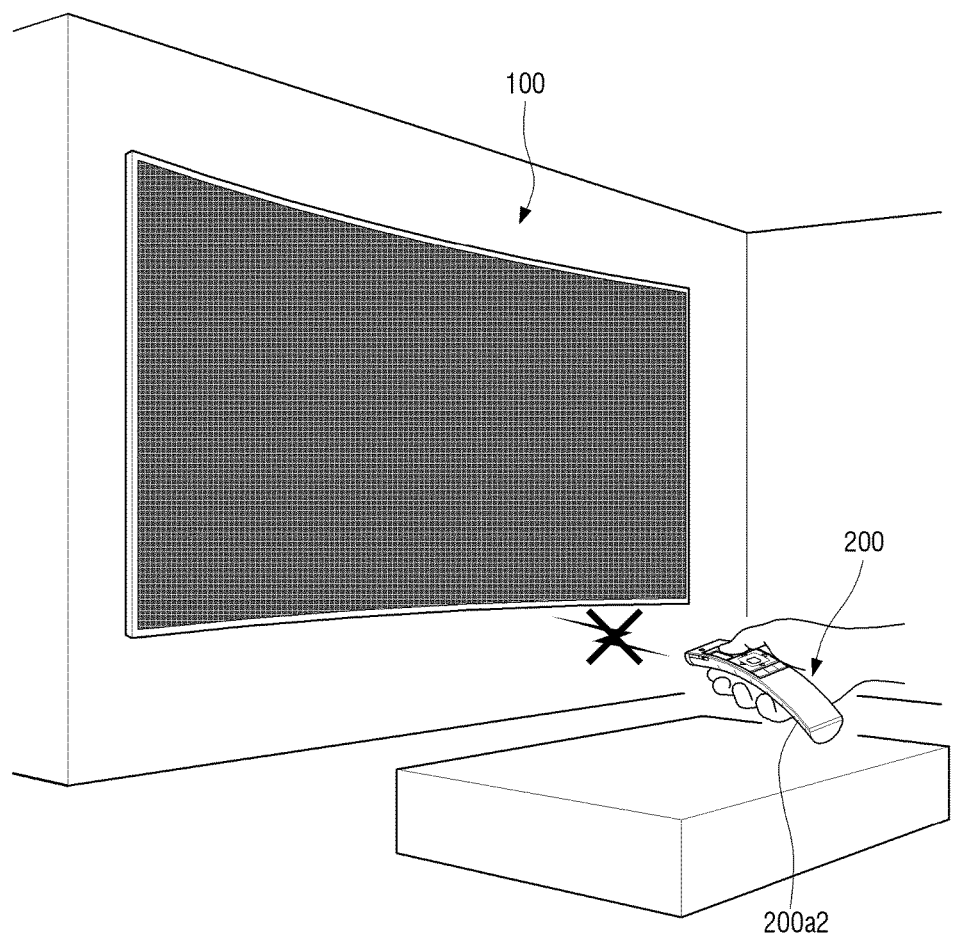

Referring to FIGS. 4 and 5C, the operational mode of the display apparatus 100 may be changed into the pre-power on mode from the standby mode in response to the first control signal (operation S404).

When the first control signal is received, the sub processor (not illustrated) may wake up the main processor (not illustrated).

When the main processor (not illustrated) is waking up, the operational mode of the display apparatus 100 may be changed from the standby mode into the pre-power on mode.

The screen may be continuously turned off in the pre-power on mode of the display apparatus 100. In the pre-power on mode, the controller 110 may control the power supply 190 not to provide power to the display 170. Further, in the pre-power on mode, the controller 110 may control the power supply 190 to provide power, in contrast to the normal mode (e.g., power consumption is different) in which a broadcasting channel is displayed on the display 170.

In the pre-power on mode of the display apparatus 100, the audio outputter 175 may be powered off (e.g., the audio is not outputted). In the pre-power on mode, the controller 110 may control the power supply 190 not to provide power to the audio outputter 175. Further, in the pre-power on mode, the controller 110 may control the power supply 190 to provide power, in contrast to the normal mode (e.g., power consumption is different) which outputs sound to the audio outputter 190.

In the pre-power on mode of the display apparatus 100, the controller 110 may provide power to the other elements except for the display 170 and the audio outputter 175. Further, in the pre-power on mode of the display apparatus 100, the controller 110 may provide power to the other elements except for one of the display 170 and the audio outputter 175. In the pre-power on mode of the display apparatus 100, the other elements except for one of the display 170 and the audio outputter 175 may operate (e.g., content receiving or broadcasting receiving).

In the pre-power on mode of the display apparatus 100, the controller 110 may not output the video, the audio and/or the data included in the received broadcasting signal (e.g., the video of the display 170 and/or the audio of the audio outputter 175).

The operational mode of the display apparatus 100 may be changed into the pre-power on mode from the standby mode after 12.5 ms passes in response to receiving the first control information.

When the display apparatus 100, in the pre-power on mode, does not receive the second control signal from the remote controller 200 for a predetermined time (e.g., 5 min., the predetermined time is modifiable), a state of the display apparatus 100 may be changed to the standby mode (screen off) from the pre-power on mode.

Figure 7:
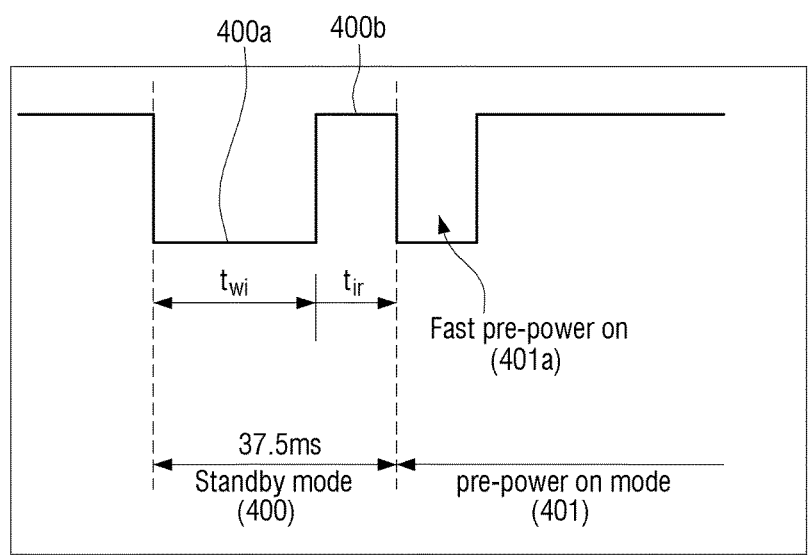
FIG. 7 is a diagram illustrating a pre-power on mode time of a method for controlling display of a display apparatus according to an exemplary embodiment.

FIG. 7 is a diagram illustrating the pre-power on mode time in the method for controlling the display of the display apparatus according to an exemplary embodiment.

Referring to FIG. 7, a wave form from the standby mode (screen off) of the display apparatus 100 to the pre-power on mode may be illustrated. The time of the standby mode 400 may include a first wake-up indication time 400a and a second intermission time 400b. When the first control signal is not received, the display apparatus 100 may standby to scan BLE advertising packet transmitted externally.

The minimum standby mode time before BLE advertising packet is received may be, for example, 37.5 ms. For example, the minimum standby mode time may be more than 25.0 ms and less than 100.0 ms.

The time 401 of the pre-power on mode may include a third fast pre-power on time 401a that corresponds to receiving of the first control signal. When the second control signal is not received from the remote controller 200 for a predetermined time (e.g., 5 min., the predetermined time is modifiable) in the pre-power on mode, a state of the display apparatus 100 may be changed to the standby mode (screen off).

When the second control signal is received in the pre-power on mode, the display apparatus 100 may display contents on the screen.

The minimum standby mode time may be changed according to performance of the near field communicator 133 in the display apparatus 100 (e.g., increase or decrease of the minimum standby mode time), which can be easily understood by those of ordinary skill in the art.

In the display apparatus 100, a booting time may be shortened by being changed into the pre-power on mode by BLE advertising packet (e.g., for several seconds).

According to another exemplary embodiment, the controller 110 of the display apparatus 100, in the pre-power on mode, may display an established screen (e.g., a welcome screen (not illustrated)) on the screen. The welcome screen (not illustrated) may be a screen displayed in response to changing of the pre-power on mode in the display apparatus 100. The welcome screen (not illustrated) may be displayed in an established shape on a portion of the screen (e.g., a center area of the screen). The other area of the screen of the display apparatus 100 in which the welcome screen (not illustrated) is not displayed may be a background (e.g., powered-off background or black screen).

The welcome screen (not illustrated) may be displayed by power provided to a portion of the display 170 by control of the controller 110. The welcome screen (not illustrated) may be a screen displayed by providing power to a portion of the screen, in contrast to the normal mode (e.g., power consumption is different) in which contents are displayed on the screen.

At operation S340 of FIG. 3, the second control signal corresponding to the second user input detected in the remote controller may be received.

Figure 5D:
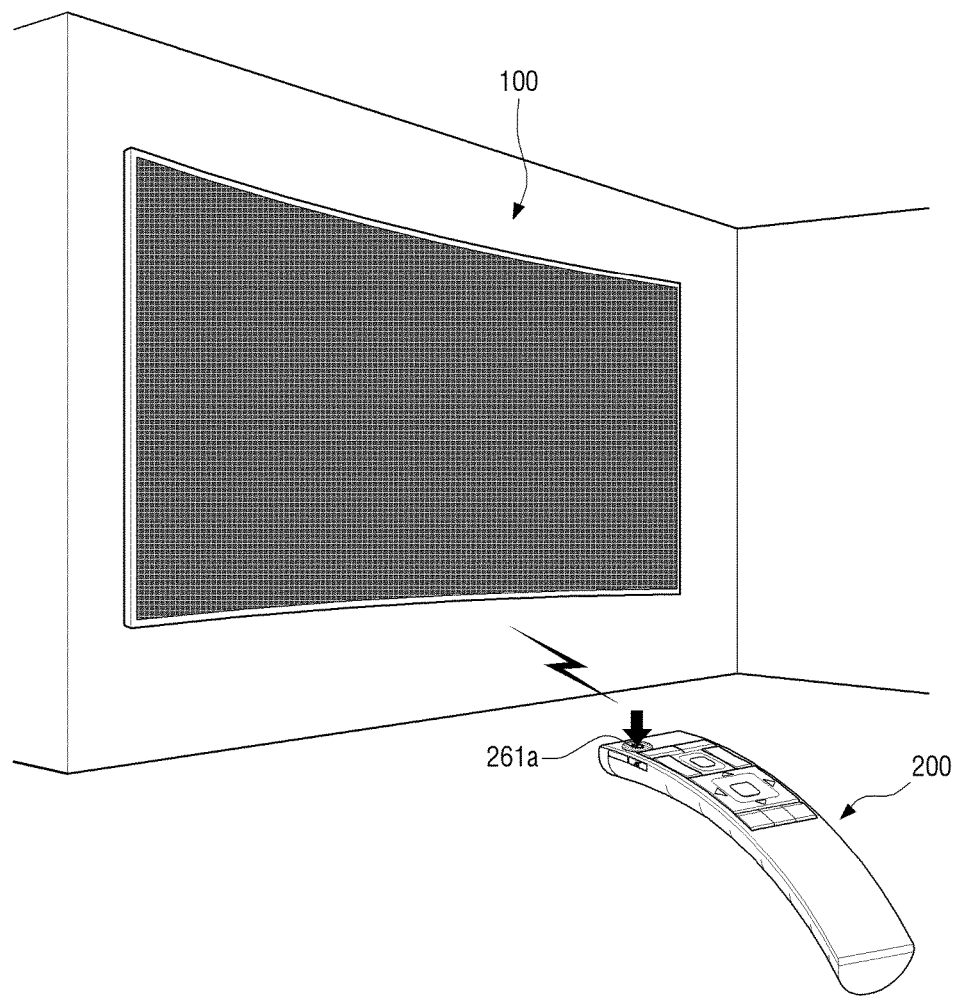

Referring to FIGS. 4 and 5D, the second user input may be received by using the power button 261a of the remote controller 200 (operation S405).

A user may input a second user input on the power button 261a of the remote controller 200. A second user input of the power button 261a (or selecting of the power button 261a) may include a push of the power button 261a, a touch of the power button 261a, and/or touch gestures of the power button 261a. Further, the selecting of the power button 261a may include the user voice inputted through the microphone 263 (e.g., corresponding to the power on) or the user gesture detected through the sensor 264 (e.g., grip the remote controller 200 and draw a circle).

The controller 210 of the remote controller 200 may store the power button select information corresponding to the selecting of the power button 261a in the storage 280. The stored power button select information may include power button select information ID for the record management or power button select time.

The controller 210 may generate the second control information transmitted to the display apparatus 100 by using the stored power button select information. The controller 210 may load the second control information stored in the storage 280 or select the second control information among a plurality of control information in response to detecting of the second user input. The second control information may be control information that can display a content 300 (e.g., a broadcasting channel or a video) on the screen of the display apparatus 100.

Referring to FIGS. 4 and 5D, the controller 210 may transmit the second control information to the display apparatus 100 (operation S409).

The controller 210 may transmit the second control information to the display apparatus 100 through the communicator 230. The controller 210 may transmit the second control information as BLE packet through the near field communicator 232 to the display apparatus 100.

The controller 210 may periodically transmit the first control information through the near field communicator 232 to the display apparatus 100.

The communicator 130 of the display apparatus 100 may receive BLE packet including the second control information from the remote controller 200 by control of the controller 110. The received first control information may be stored in the storage 180 by control of the controller 110.

At operation S350 of FIG. 3, the broadcasting may be displayed on the screen of the display apparatus.

Figure 5E:
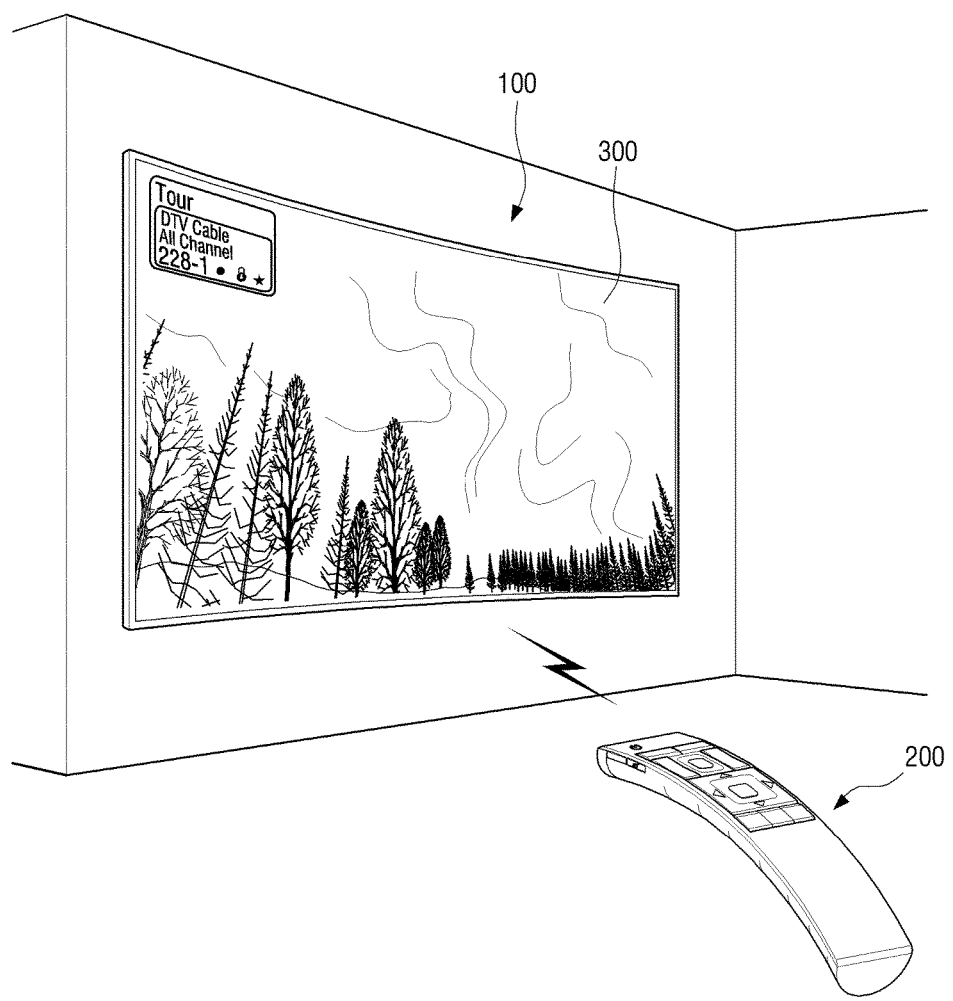

Referring to FIGS. 4 and 5E, a broadcasting channel 300 (e.g., a broadcasting or content at the cable broadcasting channel number 228-1) may be displayed on the screen of the display apparatus 100 (operation S407). Further, the welcome screen (not illustrated) may close on the screen of the display apparatus 100, and the broadcasting channel 300 may be displayed.

The content displayed on the screen of the display apparatus 100 may include the video which is reproduced through an application installed in the display apparatus 100, the image displayed through an application, or the web page displayed through web browser in addition to the broadcasting channel.

The controller 110 of the display apparatus 100 may change the operational mode of the display apparatus 100 from the pre-power on mode to the normal mode in response to the received second control information.

In response to receiving of the second control information, the controller 110 of the display apparatus 100 may display the broadcasting screen 300 on the display apparatus 100 after a time interval of 12.5 ms to 300 ms has elapsed.

When a user grips the remote controller 200 and selects the power button 261a, the time for displaying of the broadcasting on the screen of the display apparatus 100 may be elapsed for more than three seconds (e.g., five seconds according to the display apparatus).

In response to receiving of the second control information, the storage 180 may store the second control information by control of the controller 110.

The controller 110 may provide visual feedback, such as animation effects in response to displaying of contents on the screen. Further, the controller 110 may provide auditory feedback through the audio outputter 175 in response to displaying of contents on the screen.

At operation S350 of FIG. 3, when contents are displayed on the screen of the display apparatus 100, the method for controlling the display of the display apparatus may complete.

Although the above exemplary embodiments are described based on the display apparatus and the remote controller, it may be applied to various types of electronic devices. For example, the above exemplary embodiments may be applied between a source device and external devices which are connected with a Bluetooth low energy.

The methods according to the exemplary embodiments may be implemented as a program command that can be executed through various computer means, and be recorded on a transitory or non-transitory computer readable recording medium. The computer readable recording medium may include anyone or more of program commands, data files, and data structures, or the like. For example, the computer readable recording medium may be stored in a volatile or a non-volatile storing device such as ROM, a memory such as RAM, memory chip, or integrated circuit, or storing medium that can be read by a machine (e.g., computer) while simultaneously being recorded optically or magnetically such as CD, DVD, magnetic disk or magnetic tape, regardless of whether to perform the deleting or perform the re-recording.

A memory that can be included within a portable terminal may be one example of the storing medium that can be read by a machine, which is proper for storing a program or programs including instructions implementing the above exemplary embodiments. The program instructions recorded on the above medium may be specifically established or constituted for the present disclosure, or can be used by being published to a person of ordinary skill in the computer software art. The aforementioned hardware device is configured to operate as one or more software modules for the operations of the exemplary embodiments, and the reverse is the same.

The foregoing exemplary embodiments and advantages are merely exemplary and are not to be construed as limiting the exemplary embodiments. The exemplary embodiments can be readily applied to other types of apparatuses. The description of the exemplary embodiments is intended to be illustrative, and not to limit the scope of the claims, and many alternatives, modifications, and variations will be apparent to those of ordinary skill in the art.

What is claimed is:

1. A display apparatus comprising:
    a display;
    a communicator; and
    a processor configured to:
        control the communicator to scan a Bluetooth Low Energy (BLE) advertising packet in a standby mode in which the display apparatus is powered off except for the communicator,
        in response to the BLE advertising packet being received from a remote control device in the standby mode, change the display apparatus from the standby mode into a pre-power on mode by activating element except the display, and
        in response to a BLE packet, which is different from the BLE advertising packet being received from the remote control device, change the display apparatus from the pre-power on mode into a normal mode by further activating the display, and control the display to display content in the normal mode.

2. The display apparatus of claim 1, further comprising a power supply, wherein the processor is further configured to control the power supply to provide power to the display apparatus except for the display in the pre-power on mode.

3. The display apparatus of claim 1, wherein the processor is further configured to control a near field communicator to receive the BLE advertising packet.

4. The display apparatus of claim 1, wherein the BLE advertising packet is received through an optical receiver.

5. The display apparatus of claim 1, further comprising:
    an audio outputter; and
    a power supply,
    wherein the processor is further configured to control the power supply to provide power to the display apparatus except for the audio outputter in the pre-power on mode.

6. The display apparatus of claim 2, wherein the processor is further configured to control the power supply to continuously provide power to the communicator in the standby mode.

7. The display apparatus of claim 1, wherein the processor comprises a main processor and a sub processor, and
    the communicator is controlled by the sub processor in the standby mode.

8. The display apparatus of claim 1, wherein the processor is further configured to control the display to display a preset screen on a portion of the display apparatus in the pre-power on mode.

9. The display apparatus of claim 1, wherein, in response to the second control information being not received for a predetermined time in the pre-power on mode, the processor is further configured to change the display apparatus from the pre-power on mode to the standby mode.

10. A method for controlling a display of a display apparatus, the method comprising:
    scanning a Bluetooth Low Energy (BLE) advertising packet in a standby mode in which the display apparatus is powered off except for a communicator,
    receiving, in the standby mode, the BLE advertising packet from a remote control device through the communicator;
    changing the display apparatus from the standby mode into a pre-power on mode by activating an element except a display included in the display apparatus;
    receiving, in the pre-power on mode, a BLE packet which is different from the BLE advertising packet from the remote control device; and
    changing the display apparatus from the pre-power on mode into a normal mode by further activating the display and displaying content on the display in the normal mode.

11. A remote control device comprising:
    a sensor;
    a power button;
    a communicator; and
    a processor configured to:
    control the communicator to transmit a Bluetooth Low Energy (BLE) advertising packet comprising first control information that corresponds to a first user input sensed by the sensor to a display apparatus in which a display is powered off, and control the communicator to transmit a BLE packet, which is different from the BLE advertising packet comprising first control information that corresponds to a second user input of selecting of a power button to the display apparatus.

12. The remote control device of claim 11, wherein the first user input comprises at least one from among a touch directed to the remote control device, a grip directed to the remote control device, a motion of the remote control device, and an acceleration change of the remote control device.

13. The remote control device of claim 11, wherein the processor is further configured to provide at least one of an auditory feedback and a tactile feedback in response to at least one of the transmission of the BLE advertising packet and the transmission of the BLE packet which is different from the BLE advertising packet.

* * * * *